US012774654B2

(12) United States Patent
Kraler et al.

(10) Patent No.: US 12,774,654 B2
(45) Date of Patent: Oct. 27, 2026

(54) FILM TUNNEL FOR ROADWAYS

(71) Applicant: Energy Membrane GmbH, Abfaltersbach (AT)

(72) Inventors: Andreas Kraler, Abfaltersbach (AT); Robert Roithmayr, Lienz (AT)

(73) Assignee: Energy Membrane GmbH, Abfaltersbach (AT)

( * ) Notice: Subject to any disclaimer, the term of this patent is extended or adjusted under 35 U.S.C. 154(b) by 276 days.

(21) Appl. No.: 18/705,035

(22) PCT Filed: Oct. 27, 2022

(86) PCT No.: PCT/AT2022/060373
§ 371 (c)(1),
(2) Date: Apr. 26, 2024

(87) PCT Pub. No.: WO2023/070143
PCT Pub. Date: May 4, 2023

(65) Prior Publication Data
US 2025/0270930 A1 Aug. 28, 2025

(30) Foreign Application Priority Data
Oct. 29, 2021 (AT) .............................. A 50860/2021

(51) Int. Cl.
*E21F 1/00* (2006.01)
*A62C 3/02* (2006.01)
(Continued)

(52) U.S. Cl.
CPC ............ *E21F 1/003* (2013.01); *A62C 3/0221* (2013.01); *F24S 20/60* (2018.05); *F24S 80/20* (2018.05)

(58) Field of Classification Search
CPC .. E01C 1/00; E01C 1/001; E21F 1/003; E01F 8/00; A62C 3/0221; F24S 20/60; F24S 80/20
See application file for complete search history.

(56) References Cited

U.S. PATENT DOCUMENTS 10,960,740 B2 3/2021 Ten-Jet-Foei
2005/0034394 A1* 2/2005 Chiaves .................... E04C 3/44 52/292

FOREIGN PATENT DOCUMENTS

CN 109153318 A 1/2010
CN 107386137 A 11/2017
(Continued)

OTHER PUBLICATIONS

International Search Report in PCT/AT2022/060373, mailed Feb. 24, 2023.

*Primary Examiner* — Abigail A Risic
(74) *Attorney, Agent, or Firm* — Collard & Roe, P.C.

(57) ABSTRACT

A film tunnel for forming a roadway roof has supports between which at least one film is stretched. The supports include first and second groups of supports, the first group supports arranged on a first side and the second group supports arranged on a second opposite side of a longitudinal center plane of the film tunnel. The first and second group supports form pairs of supports having spaced upper free ends and connected and retained relative to one another by at least one retaining device. Each support at least of the first and/or second group has a lower part and at least one upper part. When the retaining device is released, the at least one upper part is guided by its weight force along the at least one lower part in the direction of a lower end of the at least one lower part into a lower end position.

10 Claims, 1 Drawing Sheet

Figure 1:
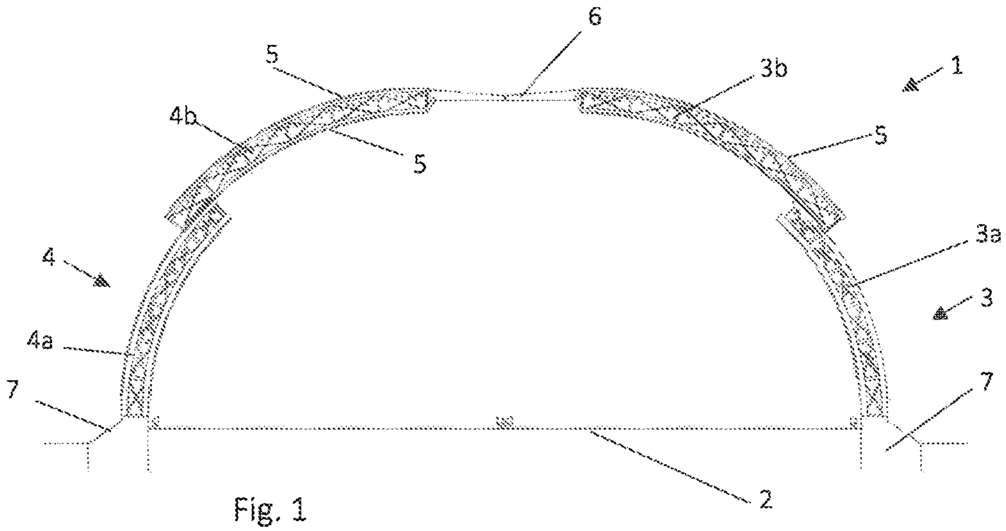

(51) Int. Cl.
*F24S 20/60* (2018.01)
*F24S 80/20* (2018.01)

(56) References Cited

FOREIGN PATENT DOCUMENTS

| | | | | | |
|---|---|---|---|---|---|
| CN | 207749703 | U | | 8/2018 | |
| CN | 108589506 | A | | 9/2018 | |
| DE | 299 15 671 | U1 | | 12/1999 | |
| DE | 10 2006 022 245 | A1 | | 11/2007 | |
| DE | 202011102829 | U1 | * | 9/2011 | ............ E01F 8/0005 |
| EP | 0047897 | B1 | * | 6/1984 | ........... E21D 11/006 |
| EP | 3 486 370 | A1 | | 5/2019 | |
| GB | 2 394 486 | A | | 4/2004 | |
| JP | 2001-200511 | A | | 7/2001 | |
| KR | 20030048389 | A | | 6/2003 | |

* cited by examiner

FILM TUNNEL FOR ROADWAYS

CROSS REFERENCE TO RELATED APPLICATIONS

This application is the National Stage of PCT/AT2022/060373 filed on Oct. 27, 2022, which claims priority under 35 U.S.C. § 119 of Austrian Application No. A 50860/2021 filed on Oct. 29, 2021, the disclosure of which is incorporated by reference. The international application under PCT article 21(2) was not published in English.

The invention relates to a film tunnel for forming a roof over a roadway, wherein the film tunnel has supports between which at least one film is stretched.

A film tunnel of the aforementioned type is known, for example, from DE102006022245A1.

One problem experienced in film tunnels known in the art is that in the event of an accident, no barrier-free access to the scene of the accident can be guaranteed from the air. It should therefore, for instance, be ensured that a helicopter can land on the roadway. In the event of fire in the known solution, venting the tunnel by opening the tunnel walls cannot be reliably guaranteed.

It is therefore an object of the invention to guarantee simple opening of the roof when required where a roof is formed over a roadway.

This object is solved by a film tunnel as disclosed at the beginning and in accordance with the invention in that the supports comprise a first group of supports and a second group of supports, wherein the supports of the first group are all arranged on a first side with regard to a longitudinal center plane of the film tunnel and the supports of the second group are all arranged on a second side, opposite the first side, with regard to a longitudinal center plane of the film tunnel, wherein the supports of the first group, together with the supports of the second group, form pairs of supports, the upper free ends of which are arranged at a distance from one another and are connected and retained with respect to one another by means of at least one retaining device, wherein each support at least of the first group and/or the second group has a lower part and at least one upper part, wherein, when the retaining device is released, the at least one upper part is guided on account of its weight force along the at least one lower part in the direction of a lower end of the at least one lower part into a lower end position.

The solution according to the invention allows for reliable opening of the tunnel to be guaranteed when required. Given the fact that an opening movement of the upper parts is effected by their own weight, high failure safety, such as in case of fire, is also achieved.

A variation of the invention in which the at least one lower part and the at least one upper part have an arched construction has proven to be particularly advantageous.

To create the best visibility possible in the tunnel and also be able to perceive the surroundings of the tunnel well, it can be provided that the at least one film has a transmittance of between 0.80 and 0.99, in particular between 0.9 and 0.95, in a visible spectral range.

In order to limit the downward movement of the upper parts of the supports in a defined manner and also to guarantee unhindered exiting from the roadway, it can be provided that at least one lower end stop which defines the end position of the at least one upper part is arranged on the at least one lower part. The lower end stop can thereby be arranged at a height which enables lateral entry to and exit from the roadway. For example, the lower end stop can be attached in such a way that a lower edge of the upper part stops 3 m above the roadway.

In order to implement additional functionalities, such as thermal insulation or the installation of additional elements, for example for generating energy whilst guaranteeing an aesthetic appearance, it can be provided that at least between two upper parts of supports of a group, at least two films are stretched, wherein one of the films forms an outer cladding of the tunnel and one of the films forms an inner cladding of the tunnel, wherein a cavity is formed between the film forming the outer cladding and the film forming the inner cladding.

With respect to the conversion of solar energy into electrical energy, it has proven particularly advantageous that solar panels are arranged on the film forming the outer cladding, in particular are adhered to and/or connected by means of lamination. This embodiment is particularly advantageous in that a space above the roadway can be used very efficiently for electricity generation. With only very minor interferences in nature, a large area can thereby be utilized for solar electricity generation.

According to one variation of the invention which enables optimum protection and simple installation of the solar panels, it can be provided that the solar panels are arranged on a side of the film forming the outer cladding which is facing the cavity.

Furthermore, it can be provided that at least one duct for a heat and/or cooling transfer medium is arranged in the cavity. This way, in addition to and independently of the generation of solar electricity, heat or cold can be guided out of the tunnel and used for heating or cooling elsewhere.

In a particularly preferred embodiment, it can be provided that a phase change material is arranged in the at least one duct. By using a phase change material, when there is a change of physical state, such as from a liquid to a solid state or from a gaseous to a liquid state, thermal energy can be emitted or, in the case of a change from a solid to a liquid or from a liquid to a gaseous physical state, absorbed, without the temperature of the storage medium changing significantly. These properties make phase change materials very suitable for a transportation of thermal energy from the film tunnel to an end user, including over long distances.

Heating of the cavity and thus efficiency of the film tunnel can be improved by filling the cavity with a greenhouse gas, in particular $CO_2$.

For a better understanding of the invention, it is explained in more detail with reference to the following figures.

Figure 2:
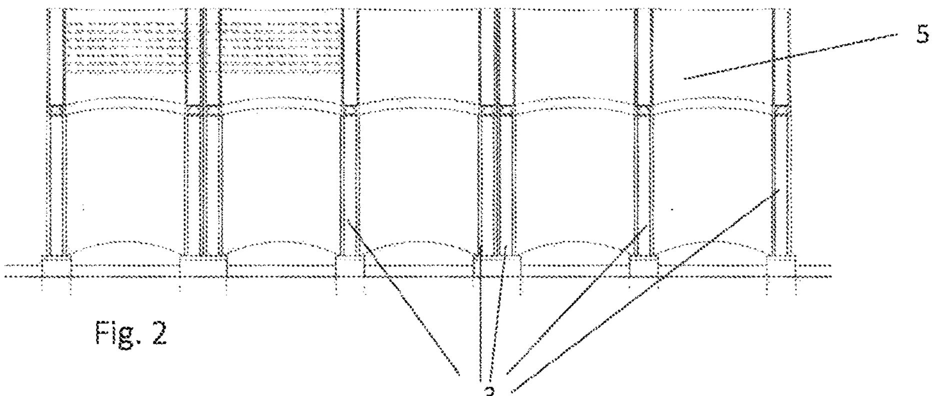

These show in significantly simplified, schematic representation:

FIG. 1 a cross section through a film tunnel according to the invention;

FIG. 2 a side view of the film tunnel from FIG. 1, and

Figure 3:
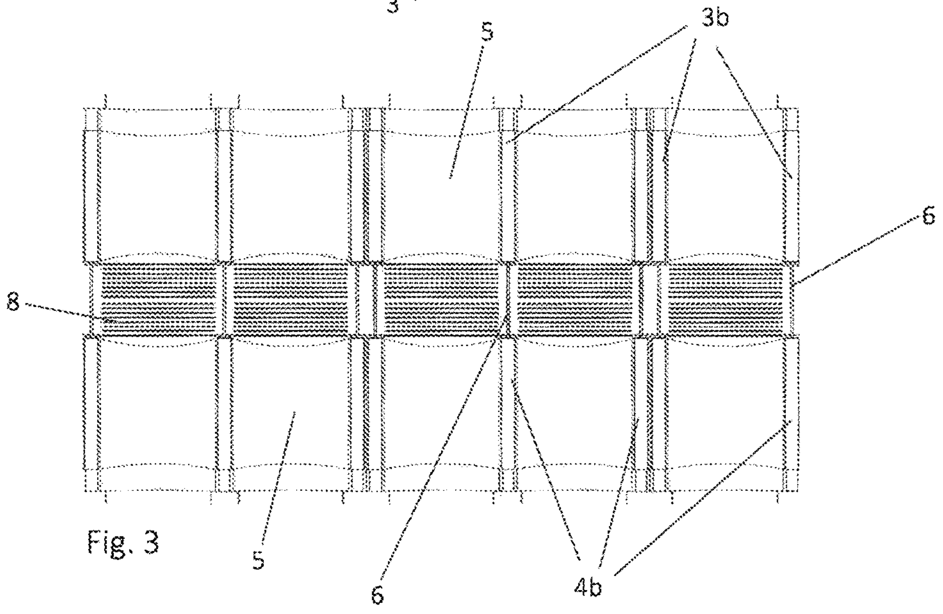

FIG. 3 a top view of the film tunnel from FIG. 1.

It is worth noting here that the same parts have been given the same reference numerals or same component configurations in the embodiments described differently, yet the disclosures contained throughout the entire description can be applied analogously to the same parts with the same reference numerals or the same component configurations. The indications of position selected in the description, such as above, below, on the side etc. refer to the figure directly described and shown, and these indications of position can be applied in the same way to the new position should the position change.

The invention is described in the following with reference to all figures.

According to FIGS. 1 and 2, a film tunnel 1 for forming a roof over a roadway 2 having supports 3, 4.

A film 5 is stretched between the supports 3 and supports 4. The supports 3, 4 form a first group of supports 3 and a second group of supports 4. The supports 3 of the first group are arranged on a first side with regard to a longitudinal center plane & of the film tunnel 1 and the supports 4 of the second group are arranged on a second side, opposite the first side, with regard to a longitudinal center plane ε of the film tunnel 1. It is thereby particularly preferable that the film 5 is stretched between adjacent supports 3 or between two adjacent supports 4.

The supports 3 of the first group with the supports 4 of the second group form pairs of supports 3, 4, the upper free ends of which are arranged at a distance from one another and are connected and retained with respect to one another by means of a retaining device 6. The retaining device 6 can, for example, be formed by the film 5 or by a rope, a rod, a chain etc. Preferably, the retaining device 6 is made from a thermoplastic material which deforms and tears under the influence of heat, such that in case of fire the retaining device is reliably released. Alternatively, the retaining device 6 can, however, also be made from a fire-resistant material; in this case the retaining device 6 can be fixed in a releasable fashion with a fastener on one of the two supports 3, 4, whilst it is preferably not mounted releasably on the other support so that the retaining device 6 can be prevented from falling down onto the roadway 2 if the connection between the supports 3, 4 is released. All types of force- and/or form-locking fasteners can be an option as releasable fasteners. For instance, one end of the retaining device 6 can be clamped between releasable jaws. The retaining device 6 can also have a grommet at its end which can be secured with a movable bolt. If a fastener is used, it should preferably be coupled to a monitoring system, such as a fire control system, such that it can be automatically triggered if needed. Manual triggering via remote control of the fastener is also possible.

Each support 3 of the first group and/or each support 4 of the second group has a lower part 3*a*, 4*a* and an upper part 3*b*, 4*b*. Although in the embodiment depicted all supports 3, 4 have a two-part construction, in practice there can be situations in which only the supports 3 of the first group or only the supports 4 of the second group have to have a two-part construction. As can be seen in FIG. 1, the lower part 3*a*, 4*a* and the upper part 3*b*, 4*b* can have an arched construction, although other shapes are, however, also possible, such as linear construction of parts 3*a*, 3*b*, 4*a*, 4*b*. For instance, the lower parts 3*a*, 4*a* and the upper parts 3*b*, 4*b* could have a ladder-like construction. It can further be seen in FIG. 1 that the parts 3*a*, 3*b*, 4*a*, 4*b* which form a support structure are constructed as a framework. To prevent parts such as screws, bolts and the like from falling down, the framework or the supports 3, 4 preferably only have welding and coupling connections. For weight reasons, the supports 3, 4 are particularly preferably made from a light construction material such as aluminum.

As can be seen in FIG. 3, the upper parts 3*b*, 4*b* of the supports 3 and 4 are connected with one another via the retaining device 6. The retaining device 6 is pre-tensioned by the weight force of the upper part or the upper parts 3*b*, 4*b*. When the retaining device 6 is released, the respective upper part 3*b*, 4*b* is guided on account of its weight force along the corresponding lower part 3*a*, 4*a* in the direction of a lower end of the one lower part 3*a*, 4*a* into a lower end position and the film tunnel 1 is opened.

A lower end stop which defines the lower end position of the corresponding upper part 3*b*, 4*b* can be configured on the lower part 3*a*, 4*a*. On bridges, the end stop can be arranged so far down on the first part 3*a*, 4*a* that the upper part 3*b*, 4*b* can, for instance, slide over the bridge edge and a fully accessible traffic area be achieved (the arch units are thereby stowed downwards over the bridge edge). On other roadways, the end stop can be mounted at a height, e.g. 3 m, which enables unhindered access to and exit from the roadway 2. To enable unhindered access to and exit from the roadway 2, it can be provided that the film 5 is only arranged in the region of the upper parts 3*b*, 4*b* and no film 5 is present in the region of the lower parts 3*a*, 4*a*. Depending on the place of deployment, a film 5 can of course also fundamentally be present on the lower parts. In particular, this can be the case on bridges where lateral exit of the roadway 2 is not possible.

If the lower part 3*a*, 4*a* has no film or an air-permeable film 5, air can flow into the region of the roadway 2 there and be discharged at the top. For this purpose, the film tunnel 1 can have a partially or completely open region in the region between the upper free ends of the upper parts 3*b*, 4*b* of the supports 3, 4. In the representation in FIG. 3, this region is partially covered with an air-permeable film 8. The air permeability of the film can, for example, be achieved with corresponding perforation. Aeration and ventilation are thereby ensured. Should a situation arise which is no longer controllable (due to accident, fire, ram air) or if the road surface has to be made accessible from outside for helicopters, fire service vehicles or similar interventions, the retaining device 6 releases and the framework slides downwards. The release of the retaining device 6 can be occasioned either by fire/smoke alarms, manually by emergency trigger units (red handle similar to on trains), or remotely via video surveillance and remote control.

Furthermore, sections of the film 5 can be equipped on three sides with a fuse wire which, as soon as it is in operation, reaches a temperature of over >240 degrees Celsius and thus causes the film material, preferably ETFE, to melt. The film 5 is thus caught on the fourth (upper) edge and thereby enables aeration of and smoke extraction from the roadway 2. Furthermore, at a lower end the supports 3, 4 can rest on a foundation 7, in particular an inclined foundation. The foundation 7 is preferably configured to be wider than the supports 3, 4, for instance as a strip foundation. The supports 3, 4 can be secured against horizontal shifting by the foundation 7. Similarly, the width of the foundation 7 protects the framework from sinking and against the impact of vertical loads on a road surface (gravel roadbeds etc.). Similarly, a wide foundation 7 is an advantage in case installations such as ducts are present at the roadside. The foundation 7 can be additionally secured with ground screw foundations. The inclination of the foundation makes it more difficult for somebody to be able to climb onto the supports 3, 4 or for animals to get onto the roadway 2.

To ensure good light conditions in the film tunnel the film 5 can have a transmittance in a visible spectral range between 0.80 and 0.99, in particular between 0.9 and 0.95. As a material for the film, ETFE has, for example, proven itself, however other suitable materials such as PTFE, PET etc. can also be used.

Furthermore, it can be provided that at least two films 5 are stretched between two upper parts 3*b*, 4*b* of supports 3, 4 of a group, wherein one of the films 5 forms an outer cladding of the film tunnel 1 and one of the films 5 forms an inner cladding of the film tunnel 1. A cavity is formed between the film 5 forming the outer cladding and the film 5 forming the inner cladding. Solar panels, which can also be referred to as photovoltaic panels, can be arranged on the film 5 forming the outer cladding. The solar panels, which are preferably flexible solar panels, can, for example, by adhered and/or connected by lamination to the outer film 5. Particularly preferably, the solar panels are arranged on a side of the film forming the outer cladding which is facing the cavity.

The entire framework comprising the supports 3, 4 and the films 5 can serve as a solar thermal collector. The framework is thus at the same time an open absorber which transfers the ambient heat via convection from sun, wind, exhaust emissions and ambient temperature (this is true both for heat and cold). The collector's large surface area thus enables good performance. The framework thus itself serves as a direct or indirect primary heat source which transfers the energy by means of one or more heat exchangers, such as regenerative heat exchangers in parallel operation, to a heat transfer medium. The heat transfer medium itself can, for example, be fashioned as a closed water-glycol circuit or also comprise a phase change material. The heat transfer medium circuit can pass through the foundation 7 in order to transport the thermal energy away from the film tunnel 1. A heat exchanger can also be arranged in the region of the foundation 7. Similarly, a cooling circuit can be connected with the framework or film tunnel 1 into which a special fluid can be filled which is suitable for producing snow. The respective cooling energy which is gained by utilising the cold sky can be performed by cooling the fluid by means of a heat exchanger and be used to produce snow. It should hereby be noted that the term roadway in the present context refers not only to roadways for motor vehicles but also to ski pistes.

Furthermore, it can be provided that the cavity is filled with a greenhouse gas, in particular $CO_2$, to increase the absorption capacity of the film tunnel 1 as a collector.

In addition to the framework itself, hose collectors or linear collectors can also be integrated into the framework which have no structural (load-bearing) effect. Thus, at least one duct for a heat and/or cooling transfer medium is arranged in the cavity. Several ducts can of course be laid in the cavity. In particular, a phase change material can also be arranged in the duct or ducts.

As a matter of form and by way of conclusion, it is noted that, to improve understanding of the structure, elements have partially not been shown to scale and/or enlarged and/or shrunk.

LIST OF REFERENCE NUMERALS

1 Film tunnel
2 Roadway
3 Support
3*a* Lower part
3*b* Upper part
4 Support
4*a* Lower part
4*b* Upper part
5 Film
6 Retaining device
7 Foundation
8 Film

The invention claimed is:

1. A film tunnel (1) for forming a roof over a roadway (2), wherein the film tunnel (1) has supports (3, 4) between which at least one film (5) is stretched, wherein the supports (3, 4) comprise a first group of supports (3) and a second group of supports (4), wherein the supports (3) of the first group are all arranged on a first side with regard to a longitudinal center plane (ε) of the film tunnel (1) and the supports (4) of the second group are all arranged on a second side, opposite the first side, with regard to a longitudinal center plane (ε) of the film tunnel, wherein the supports (3) of the first group, together with the supports of the second group (4), form pairs of supports (3, 4), the upper free ends of which are arranged at a distance from one another and are connected and retained with respect to one another by means of at least one retaining device (6), wherein each support (3, 4) at least of the first group and/or the second group has a lower part (3*a*, 4*a*) and at least one upper part (3*b*, 4*b*), wherein, when the retaining device (6) is released, the at least one upper part (3*b*, 4*b*) is guided on account of its weight force along the at least one lower part (3*a*, 4*a*) in the direction of a lower end of the at least one lower part (3*a*, 4*a*) into a lower end position.

2. The film tunnel according to claim 1, wherein the at least one lower part (3*a*, 4*a*) and the at least one upper part (3*b*, 4*b*) have an arched construction.

3. The film tunnel according to claim 1, wherein the at least one film (5) has a transmittance in a visible spectral range of between 0.80 and 0.99, in particular between 0.9 and 0.95.

4. The film tunnel according to claim 1, wherein at least one lower end stop which defines the end position of the at least one upper part (3*b*, 4*b*) is arranged on the at least one lower part (3*a*, 4*a*).

5. The film tunnel according to claim 1, wherein at least between two upper parts (3*b*, 4*b*) of supports of a group, at least two films (5) are stretched, wherein one of the films (5) forms an outer cladding of the film tunnel (1) and one of the films (5) forms an inner cladding of the film tunnel (1), wherein a cavity is formed between the film (5) forming the outer cladding and the film (5) forming the inner cladding.

6. The film tunnel according to claim 5, wherein solar panels are arranged, in particular adhered to and/or connected by lamination, on the film (5) forming the outer cladding.

7. The film tunnel according to claim 6, wherein the solar panels are arranged on a side of the film (5) forming the outer cladding which is facing the cavity.

8. The film tunnel according to claim 5, wherein at least one duct for a heat and/or cooling transfer medium is arranged in the cavity.

9. The film tunnel according to claim 8, wherein a phase change material is arranged in the at least one duct.

10. The film tunnel according to claim 5, wherein the cavity is filled with a greenhouse gas, in particular $CO_2$.

* * * * *